(12) United States Patent
Pedemonte

(10) Patent No.: US 12,207,631 B2
(45) Date of Patent: Jan. 28, 2025

(54) SPEARGUN FOR UNDERWATER FISHING

(71) Applicant: CRESSI-SUB S.p.A., Genoa (IT)

(72) Inventor: Stefano Pedemonte, Genoa (IT)

(73) Assignee: CRESSI-SUB S.p.A., Genoa (IT)

( * ) Notice: Subject to any disclaimer, the term of this patent is extended or adjusted under 35 U.S.C. 154(b) by 0 days.

(21) Appl. No.: 18/101,529

(22) Filed: Jan. 25, 2023

(65) Prior Publication Data

US 2023/0247974 A1  Aug. 10, 2023

(30) Foreign Application Priority Data

Feb. 9, 2022 (IT) .................. 102022000002375

(51) Int. Cl.
*A01K 81/06* (2006.01)
*F41B 7/00* (2006.01)
*F41B 7/04* (2006.01)

(52) U.S. Cl.
CPC ............. *A01K 81/06* (2013.01); *F41B 7/003* (2013.01); *F41B 7/046* (2013.01)

(58) Field of Classification Search
CPC ......... A01K 81/06; A01K 81/04; F41B 7/003; F41B 7/046; F41B 7/04; F41B 3/005; F41B 3/02
See application file for complete search history.

(56) References Cited

U.S. PATENT DOCUMENTS

| | | | | |
|---|---|---|---|---|
| 4,458,658 A * | 7/1984 | Blair | .................. | F41B 3/02 124/20.3 |
| 4,894,940 A * | 1/1990 | Frain | .................. | F41G 1/35 362/110 |
| 5,243,955 A * | 9/1993 | Farless | .................. | F41B 7/04 124/20.3 |
| 5,345,922 A * | 9/1994 | Ott | .................. | F41B 3/02 124/16 |
| 10,165,765 B1 * | 1/2019 | Ching | .................. | F41B 11/83 |
| 2006/0243262 A1 * | 11/2006 | Berry | .................. | A01K 81/06 124/17 |
| 2015/0204633 A1 * | 7/2015 | Nelson | .................. | F41B 11/83 124/83 |
| 2021/0041204 A1 * | 2/2021 | Koutsogiorgos | .......... | F41B 7/04 |
| 2022/0299290 A1 * | 9/2022 | Camarena-Vazquez | .................. | A01K 81/04 |

* cited by examiner

*Primary Examiner* — John E Simms, Jr.
(74) *Attorney, Agent, or Firm* — TROUTMAN PEPPER HAMILTON SANDERS LLP

(57) ABSTRACT

The speargun for underwater fishing comprises a spear, a hollow hand grip having therewithin a retaining mechanism for retaining the spear, a snap trigger of the retaining mechanism for the release of the spear, a hollow barrel fixed to the hand grip, a terminal head fixed to the barrel and supporting at least one lateral pulley on which a rubber band for the propulsive thrust of the spear is wound, and a housing for engaging one end of the rubber band, formed in a single piece with a wall of the hand grip and located in a transversal geometric plane of the speargun which includes the axis of the barrel and cuts the speargun into an upper half-part and a lower half-part.

10 Claims, 6 Drawing Sheets

SPEARGUN FOR UNDERWATER FISHING

CROSS REFERENCE TO RELATED APPLICATIONS

This application claims benefit of priority to Italian Patent Application No. 102022000002375, filed Feb. 9, 2022, the entire contents of which are hereby incorporated by reference.

FIELD

The present invention relates to a speargun for underwater fishing.

BACKGROUND

There is a known type of speargun for underwater fishing comprising a metal spear provided with one or more engagement heels, a hand grip having a mechanism for retaining the spear and provided with a trigger for releasing the spear, a barrel having an upper longitudinal guide that slidingly supports the spear, and a terminal head provided with a plurality of lateral pulleys where rubber bands are engaged which, on being subjected to a tensile force when engaged in the engagement heels of the spear retained by the retaining mechanism, accumulate potential elastic energy which is transferred to the spear, providing it with the necessary propulsive thrust when the trigger is pulled.

This type of speargun, also known in the technical jargon as a "roller" speargun, has the particularity of exploiting the whole length of the barrel to stretch the rubber band, since the rubber band at rest is positioned under the barrel.

In practical terms, given an equal length of the barrel compared to a traditional speargun that uses a circular rubber band engaged in a through hole provided on the head, a roller speargun can accumulate more potential elastic energy and consequently have greater power, something that makes it at times preferable in hunting for larger-sized prey.

Each rubber band has an end for engaging the spear and an end for engaging the hand grip.

There are various solutions for engaging the rubber band to the hand grip.

Some solutions provide for dedicated accessories that are mounted on the hand grip to create a seat for engaging the rubber band.

These solutions can complicate the structure of the speargun and compromise its convenience of use.

For example, a special pin for fixing the hand grip to the barrel has been envisaged, the pin projecting bilaterally from the hand grip and being provided with enlarged terminals that delimit, together with the wall of the hand grip, seats for engaging rubber bands.

In this case it is necessary to drill two diametrically opposite holes into the barrel for the passage of the fixing pin.

These fixing holes can permit the passage of water into the barrel, with the result that the speargun loses floatability.

In fact, if water gets inside the barrel, the diver underwater has to bear more weight than if air instead is trapped in the barrel, which gives rise to a significant Archimedes' thrust on the speargun.

In other cases, it has been chosen to adapt the hand grip by creating lower projections specifically shaped to engage the rubber band.

Such projections, by increasing the lateral profile of the speargun, impair the hydrodynamism of the speargun.

In particular, the typical movement of rotation of the arm towards the right or left, necessary in order for the diver to take aim, is made more arduous by a speargun with an increased lateral profile.

Furthermore, such projections limit the availability of space for positioning accessories such as reels and/or cameras below the hand grip.

SUMMARY

The technical task of the present invention, therefore, is to provide a "roller" speargun for underwater fishing that enables the aforementioned drawbacks of the prior art to be eliminated.

Within the scope of this technical task, one object of the invention is to provide a "roller" speargun for underwater fishing that is convenient to use, lightweight underwater and highly hydrodynamic.

Another object of the invention is to provide a "roller" speargun for underwater fishing that is not cumbersome.

Another object of the invention is to provide a "roller" speargun for underwater fishing with a simple structure.

The technical task, as well as these and other objects, are achieved according to the present invention by providing a speargun for underwater fishing comprising a spear, a hollow hand grip having therewithin a retaining mechanism for retaining said spear, a snap trigger of said retaining mechanism for the release of said spear, a tubular barrel with a circular cross section fixed to said hand grip, a terminal head fixed to said barrel and supporting at least one lateral pulley on which a rubber band for the propulsive thrust of the spear is wound, characterised in that it comprises a housing for engaging one end of said rubber band, formed in a single piece with a wall of said hand grip and located in a transversal geometric plane of said speargun which cuts said speargun into an upper half-part and a lower half-part, said transversal geometric plane of said speargun including the longitudinal axis of said barrel passing through the centre of said circular cross section of said tubular barrel.

The advantages of the solution conceived are manifold.

The system for engaging the rubber band to the hand grip is particularly simple and can be obtained together with the hand grip in a same moulding process.

The system for engaging the rubber band does not interfere with the tightness between the hand grip and the barrel, which in turn can retain therewithin the air trapped at the time of the dive: this makes the speargun lighter and facilitates the manipulation thereof underwater.

The engagement housing is entirely contained within the lateral profile of the speargun and thus does not contribute to increasing the lateral profile of the speargun.

This allows the necessary hydrodynamism of the speargun to be maintained, especially in the lateral right/left movements thereof.

Moreover, the position of the engagement housing at the height of the axis of the barrel frees up space for mounting accessories in the lower part of the hand grip.

BRIEF DESCRIPTION OF THE DRAWINGS

Additional features and advantages of the invention will become more apparent from the description of a preferred but not exclusive embodiment of the speargun for underwater fishing according to the invention, illustrated by way of non-limiting example in the appended drawings, in which:

FIG. 5a shows a variant for the housing of the rubber band;

DETAILED DESCRIPTION

Figure 1:
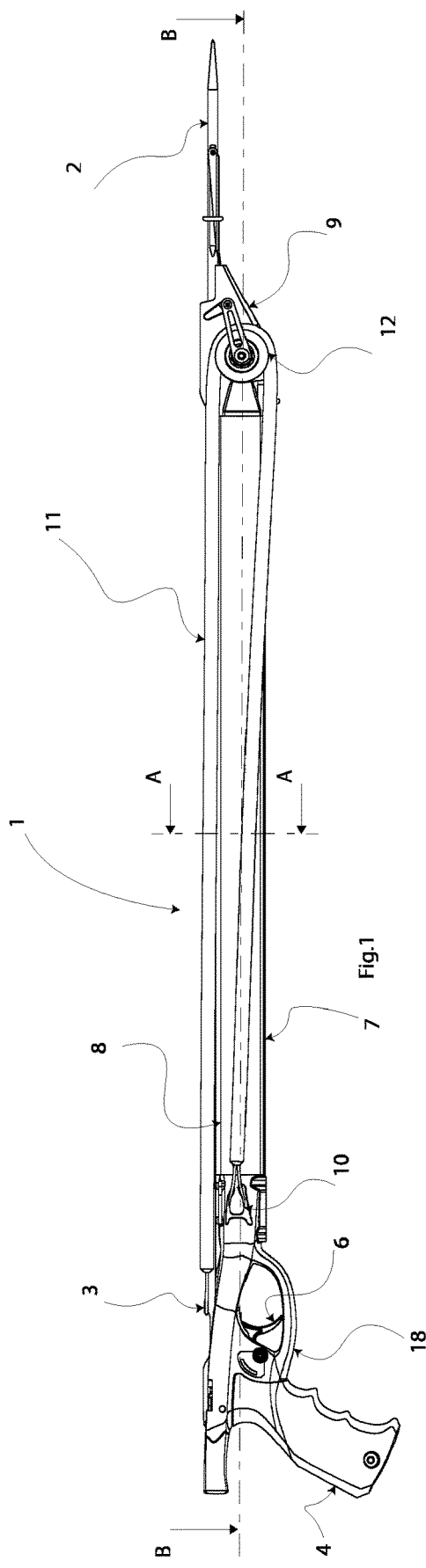
FIG. 1 shows a side elevation view of the speargun.
Figure 2:
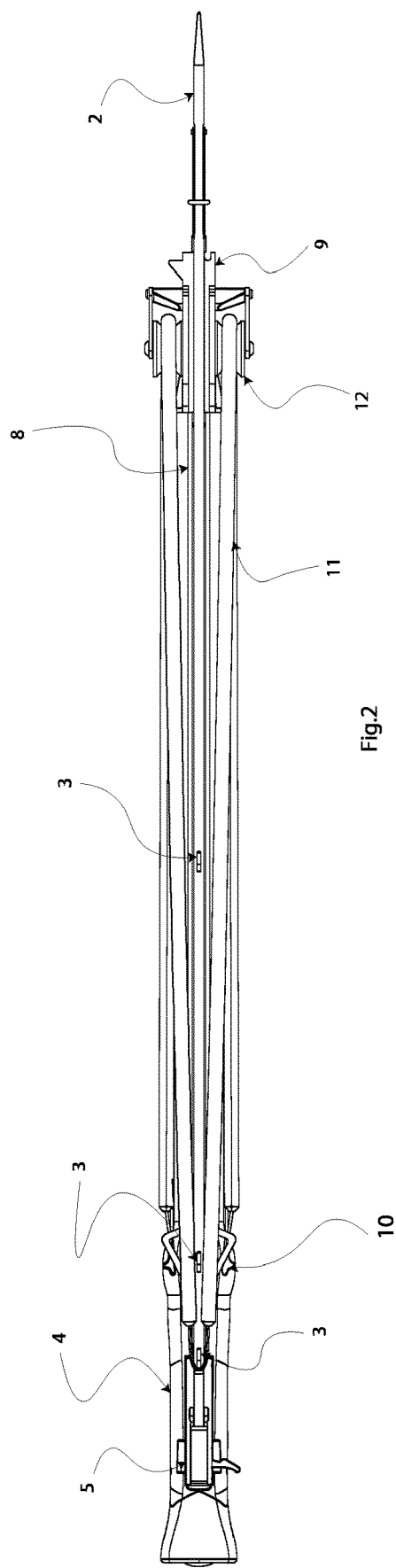
FIG. 2 shows a top view of the speargun.
Figure 3:
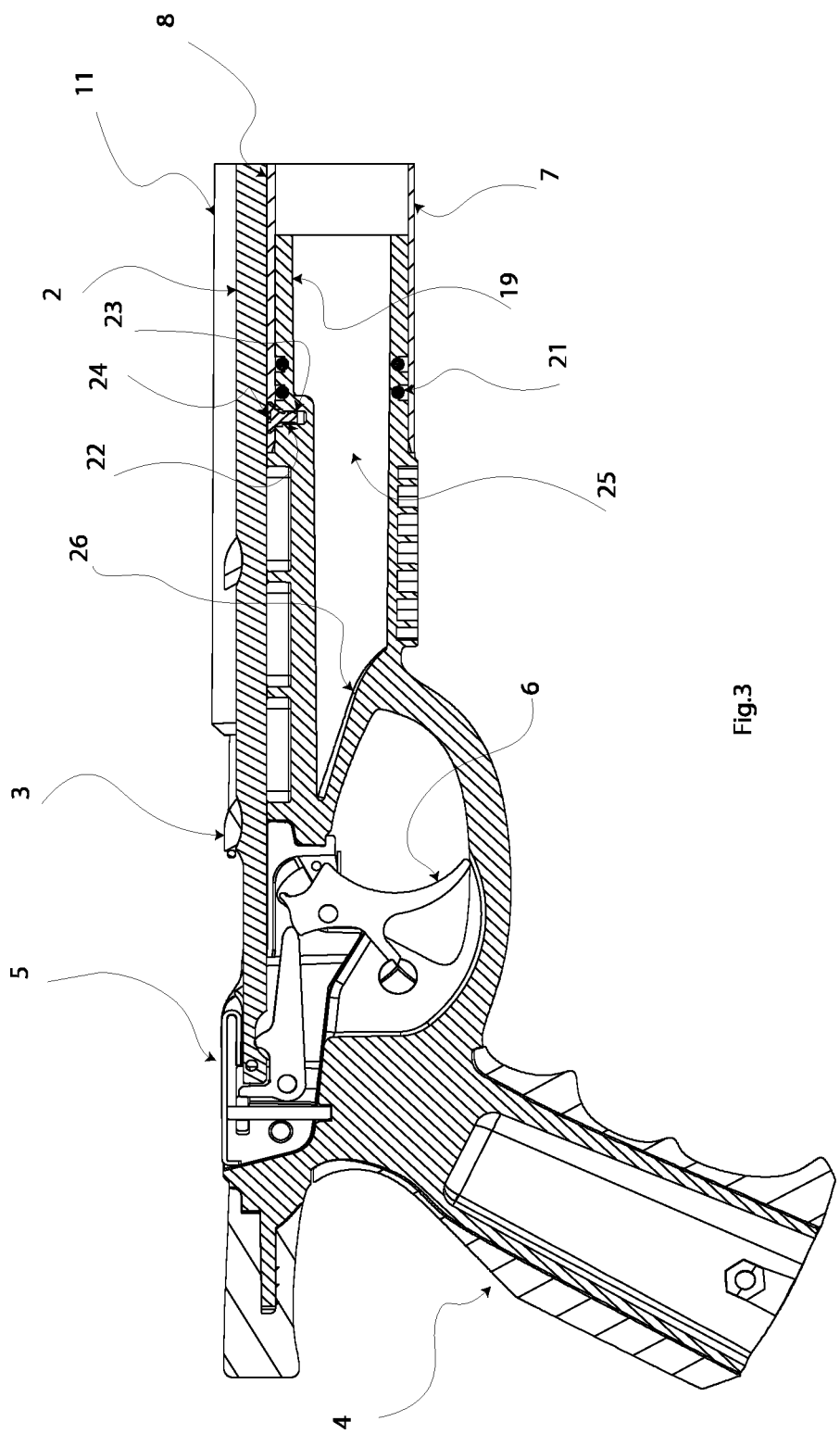
FIG. 3 shows a side elevation view of the rear portion of the speargun sectioned according to a sagittal longitudinal plane.
Figure 4:
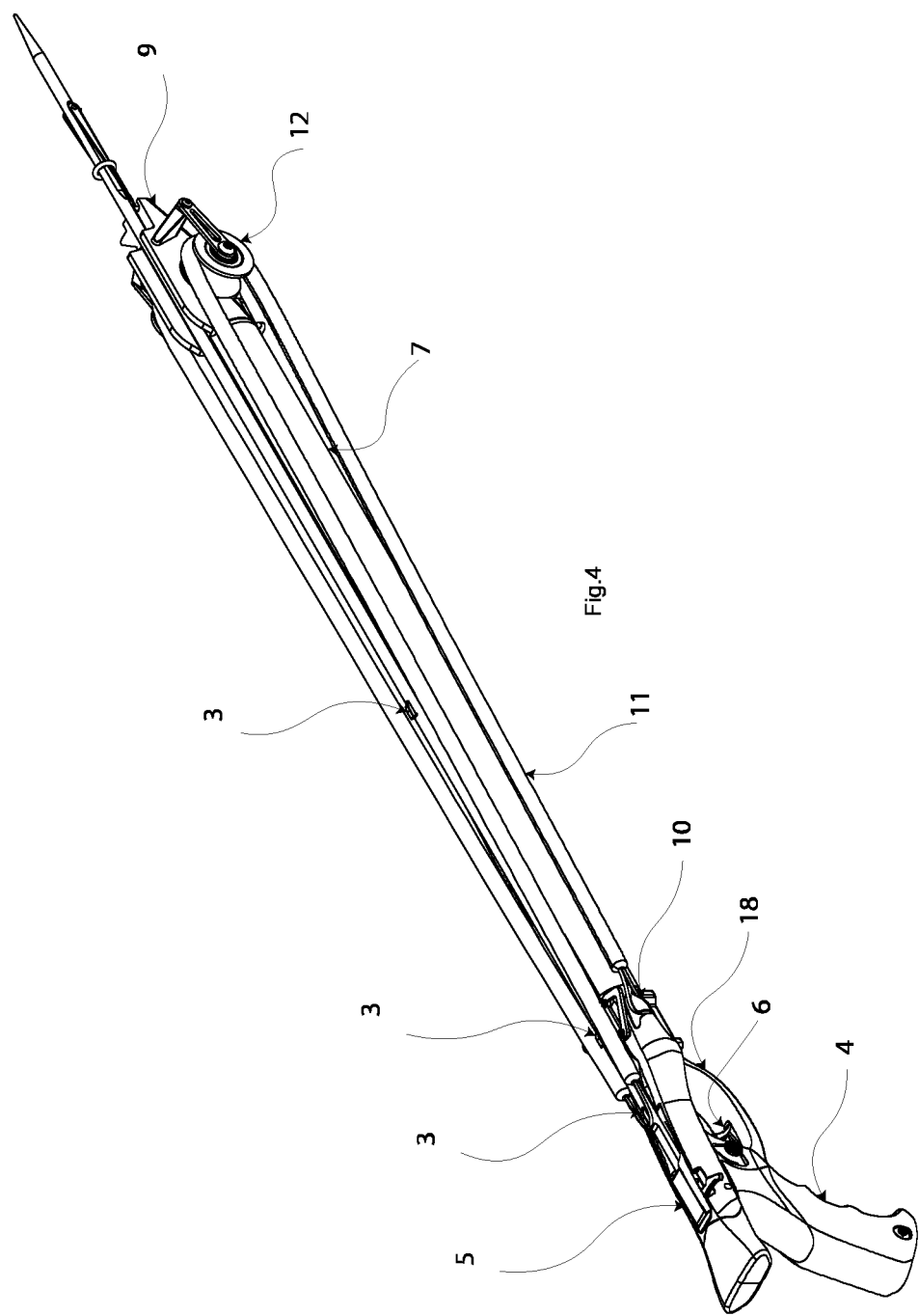
FIG. 4 shows an axonometric view of the speargun.
Figure 5:
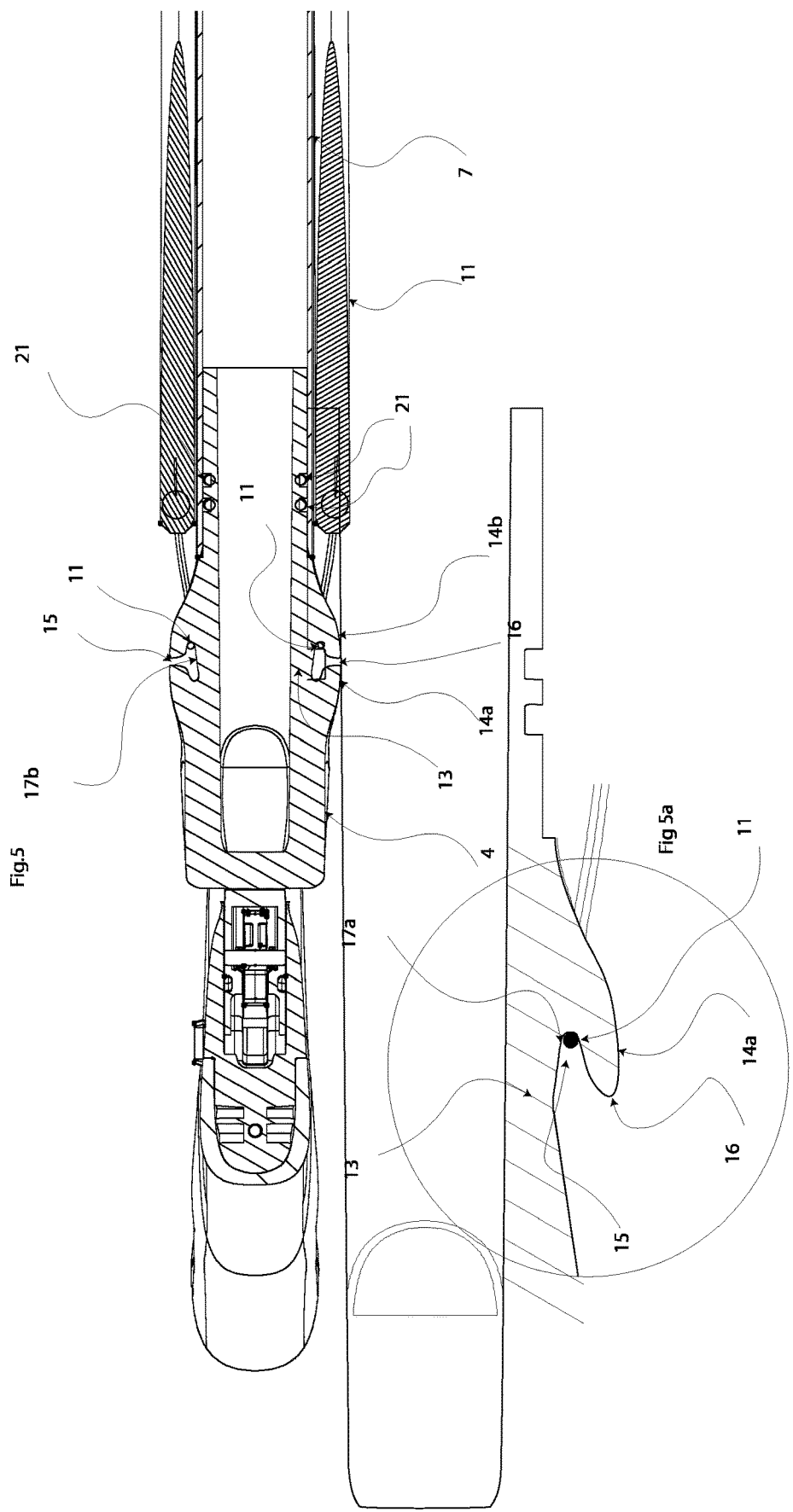
FIG. 5 shows a top view of the area of junction between the hand grip and barrel sectioned along a transversal plane B-B of FIG. 1 which includes the axis of the barrel and cuts the speargun into an upper half-part and a lower half-part.
Figure 6:
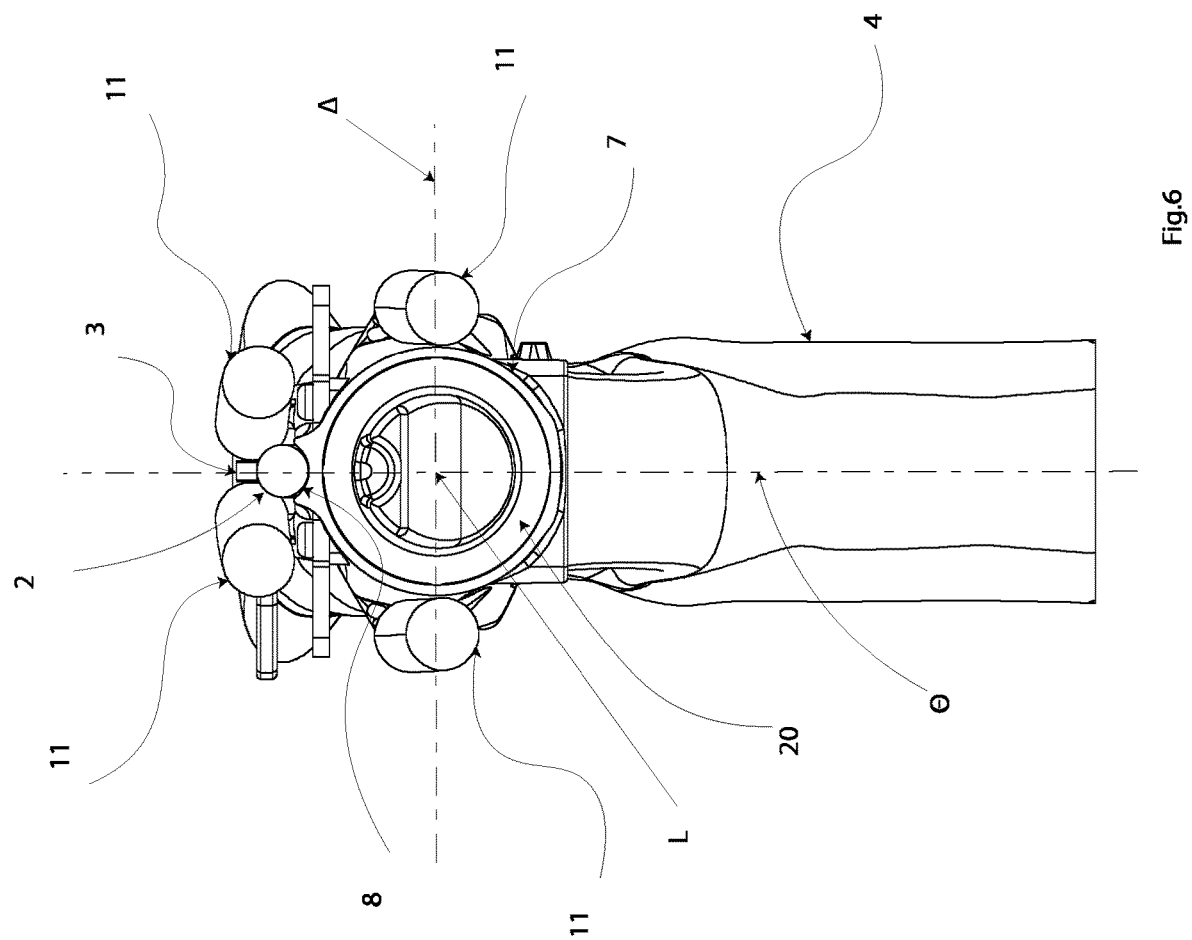
FIG. 6 shows a front view of the speargun in a section along the plane A-A of FIG. 1.

The speargun 1 comprises, in a known manner, a metal spear 2, a hand grip 4 having a retaining mechanism 5 for retaining the metal spear 2, a snap trigger 6 of the retaining mechanism 5 for the release of the spear 2, a hollow barrel 7, particularly a tubular one with a circular cross section, having an upper longitudinal guide 8 that slidingly supports the metal spear 2, and a terminal head 9.

The metal spear 2 has one or more heels 3 at the top for engaging one or more rubber bands 11 for the propulsive thrust of the metal spear 2 and, in a more rearward position diametrically opposed to the heels 3, a further heel (not shown) for engaging a hook of the retaining mechanism 5.

The metal spear 2 can also have a rear through hole (not shown), tied to which there is a line (not shown) that keeps the spear 2 anchored to the speargun 1 after shooting.

The mechanism 5 for retaining the spear 2 is housed in the hand grip 4 and, being of a well-known type, it will not be described in detail.

The rubber bands 11 are wound around respective pulleys 12, in particular, in the case illustrated, two coaxial pulleys 12 supported by opposite sides of the terminal head 9.

The axis of the two pulleys 12 is orthogonal to a sagittal geometric plane Θ of the speargun 1 which divides the speargun 1 into a right half-part and a left half-part.

The rubber bands 11, engaged, as we shall see, to the hand grip 4, are placed under a tensile force when the diver engages them in the engagement heels 3 of the metal spear 2 retained by the retaining mechanism 5 in the launching position in the longitudinal guide 8.

As is typical of a roller speargun, the rubber bands 11 at rest are positioned under the barrel 7 and are stretched over the top of the barrel 7 by sliding in the pulleys 12.

The barrel 7 is generally formed by a tubular element made of metal, for example aluminium or an alloy thereof, at the rear of which the hand grip 4 is fixed and at the front of which the terminal head 9 is fixed.

The hand grip 4 provides, for each rubber band 11, a respective housing 10 for engaging the end of the rubber band 11 opposite the one that must be engaged to one of the heels 3 of the spear 2.

The housing 10 is defined by at least one outer protrusion of the hand grip 4.

The housing 10 is advantageously formed in a single piece with a wall 13 of the hand grip 4 and is located in a transversal geometric plane A of the speargun 1 which includes the longitudinal axis L of the barrel 7 and cuts the speargun 1 into an upper half-part and a lower half-part.

The transversal geometric plane A of the speargun 1 includes in particular the longitudinal axis L of the tubular barrel 7 passing through the centre of the circular cross section of the tubular barrel 7.

The housing 10 is formed on an outer side of the hand grip 4.

In the case under examination, two housings are provided 10, one for each rubber band 11, positioned symmetrically on the two opposite sides of the hand grip 4.

The housing 10 comprises one or two projections 14a, 14b delimiting an area of entrapment 15 of the rubber band 11 and a throat 16 for access to the area of entrapment 15.

The throat 16 for access to said area of entrapment 15 is delimited by the free ends of the projections 14a, 14b if two projections 14a, 14b are provided.

If only one projection 14a is provided, the access throat 16 is delimited between the projection 14a and the wall 13 of the hand grip 4.

The area of entrapment 15 extends longitudinally in the front-to-rear direction of the speargun 1.

The area of entrapment 15 is open in the direction orthogonal to the transversal geometric plane A of the speargun 1.

The access throat 16 extends transversally to the longitudinal area of entrapment 15, in particular orthogonally to the sagittal geometric plane θ of the speargun 1, if two projections 14a, 14b are provided.

In the case, not shown, where only one projection 14a is provided, the access throat 16 extends in the front-to-rear direction of the speargun 1.

The access throat 16 is likewise tapered from the proximal end thereof to the end distal to the area of entrapment 15 or vice-versa.

The rubber band 11 is introduced into the area of entrapment 15 by making the cross section thereof pass through the access throat 16.

When it is under tension, the rubber band 11 is clamped inside the front recess 17a of the area of entrapment 15 defined by the front projection 14a and remains securely trapped: relative to the access throat 16, the front recess 17a is in fact in a more advanced position in the front-to-rear direction of the speargun 1.

If the second projection 14b is also present, the rear recess 17b of the area of entrapment 15 assures that the rubber band 11 remains in the area of entrapment 15 even in the event of a violent rebounding of the rubber band 11, which can occur when the spear 2 is released.

Typically, the housing 10 is positioned in front of a guard 18 for the trigger 6.

More precisely, the housing 10 is positioned in a front tubular part 19 of the hand grip 4 acting as a male element for a plug-in connection with the barrel 7.

For this purpose, the rear end of the tubular barrel 7 obviously has a shape mating that of the front tubular part 19 of the hand grip 4.

The front tubular part 19 of the hand grip 4 has one or, as shown, a plurality of toroidal gaskets 21 for a tight seal with the barrel 7.

The front tubular part 19 of the hand grip 4 has at least one blind hole 22 aligned with a corresponding through hole 23 of the barrel 7, where a screw 24 for fastening the barrel 7 is positioned.

As is evident, in the front tubular part 19 with a blind bottom 26 of the hand grip 4 an air trap 25 is created which extends into the barrel 7 and contributes to supporting the speargun 1 when the diver is underwater.

Advantageously, the system for fastening the barrel 7 to the hand grip 4, as it provides for one or more blind holes 22 on the front tubular part 19 of the hand grip 4, does not prejudice the tightness of the air trap 25.

The housing 10 can be formed in a single piece with the hand grip 4 by means of a simple moulding operation, for example by means of hot moulding of a suitable plastic material.

The hand grip can comprise several components mechanically assembled to one another and in that case the housing can be formed in a single piece with one of the components of the hand grip.

The speargun for underwater fishing thus conceived is susceptible of numerous modifications and variants, all falling within the scope of the inventive concept; furthermore, all of the details may be replaced by technically equivalent elements.

The materials used, as well as the dimensions, may in practice be any whatsoever, according to needs and the state of the art.

What is claimed is:

1. A speargun for underwater fishing comprising:
   a spear;
   a hollow hand grip having therewithin a retaining mechanism for retaining said spear;
   a snap trigger of said retaining mechanism for the release of said spear;
   a tubular barrel comprising:
     a front end and a rear end,
     a circular cross section fixed to said hand grip, and
     a terminal head fixed to said barrel and supporting at least one lateral pulley on which a rubber band for the propulsive thrust of the spear is wound;
   wherein the hand grip is fixed at the rear end of the tubular barrel and the terminal head is fixed at the front end of the tubular barrel;
   a housing engaging one end of said rubber band, formed in a single piece with a wall of said hand grip and located in a transversal geometric plane of said speargun which cuts said speargun into an upper half-part and a lower half-part, said transversal geometric plane of said speargun including the longitudinal axis of said barrel passing through the centre of said circular cross section of said tubular barrel, said housing being entirely contained within a lateral profile of the speargun;
   wherein said hand grip comprises a zone for the positioning of a user's hand at a position between the user's thumb and index finger, said zone being located on and below said transversal geometric plane; and
   wherein said housing is positioned in a front tubular part of the hand grip which engages with a rear end of said barrel and which has a blind bottom delimiting an air trap that extends in the barrel.

2. The speargun according to claim 1, wherein said housing is formed on an outer side of said hand grip.

3. The speargun according to claim 2, wherein said housing comprises at least one projection delimiting an area of entrapment of the rubber band and a throat for access to said area of entrapment.

4. The speargun according to claim 3, wherein said housing comprises a single projection delimiting, together with said wall, said throat for access to said area of entrapment.

5. The speargun according to claim 3, wherein said housing comprises two projections delimiting, between the free ends thereof, said throat for access to said area of entrapment.

6. The speargun according to claim 3, wherein said throat is tapered.

7. The speargun according to claim 1, wherein said housing is positioned in front of a guard of said trigger.

8. The speargun according to claim 1, wherein the tubular barrel comprises metal.

9. A method for producing a speargun, the method comprising:
   forming a hollow hand grip therewith a retaining mechanism for retaining a spear and a snap trigger of said retaining mechanism for the release of said spear;
   fixing a tubular barrel with a circular cross section to the hand grip, fixing a terminal head to the tubular barrel, the terminal head supporting at least one lateral pulley, and winding a rubber band for the propulsive thrust of a spear on the lateral pulley;
   forming a housing that engages one end of the rubber band in a single piece with a wall of the hand grip, the housing located in a transversal geometric plane of the speargun which cuts the speargun into an upper half-part and a lower half-part, the transversal geometric plane of the speargun including the longitudinal axis of the barrel passing through the centre of the circular cross section of the tubular barrel, said housing being entirely contained within a lateral profile of the speargun, said hand grip comprising a zone for the positioning of a user's hand at a position between the user's thumb and index finger, and said zone being located on and below said transversal geometric plane,
   wherein said housing is positioned in a front tubular part of the hand grip which engages with a rear end of said barrel and which has a blind bottom delimiting an air trap that extends in the barrel; and
   wherein said single piece is formed by hot moulding of plastic material.

10. The method according to claim 9, wherein the tubular barrel comprises metal.

* * * * *